Figure 1:
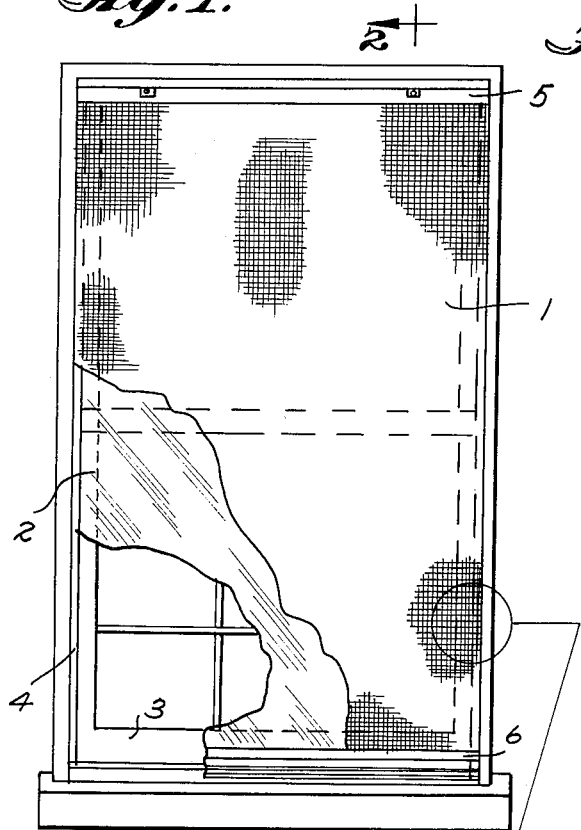

Oct. 9, 1962    N. A. GOMORY ET AL    3,057,401
COMBINATION SCREEN AND PLIABLE FILM CLOSURE
Filed Dec. 1, 1959

INVENTORS
NANETTE A. GOMORY
PAUL L. GOMORY, JR.
BY
*ATTORNEY*

United States Patent Office 3,057,401
Patented Oct. 9, 1962

3,057,401
COMBINATION SCREEN AND PLIABLE FILM CLOSURE
Nanette A. Gomory and Paul L. Gomory, Jr., both of 5609 Ogden Road, Bethesda, Md.
Filed Dec. 1, 1959, Ser. No. 856,511
4 Claims. (Cl. 160—328)

This invention relates to the closure of openings, such as window openings or other apertures, and to means for effecting a closure or protection of an opening.

In one of its aspects, the invention relates to the placing of a pliable film onto a screen, for example, of the tension type, and to the retaining of said film by the very means which retain the screen, thus, providing a screen-back pliable member or membrane, if desired, under tension, and retained by said very means. In another of its aspects, the invention relates to a method of converting an existing tension window or other aperture screen by removing the screen from its framing elements, placing on the screen a pliable film in a manner such that, when the screen is replaced into the framing elements, these elements will hold the pliable film and the screen, without more, and replacing the screen and said film into said elements. In one embodiment of the invention, a tension screen having upper and lower elements, each provided with a channel adapted to receive a beading formed at the respective ends of a screen, is disassembled and converted to a storm window or shield by laying a film of a plastic, such as polyethylene, which is somewhat longer than the screen, and said screen together so that the extra length of the plastic is at the beaded ends of the screen, folding the ends of the film which extend beyond the ends of the screen over the beading at each end of the screen and reassembling the screen so that the plastic film is retained in the channel between the channel wall and the beading on the screen. In another embodiment of the invention, the screen is so beaded or otherwise shaped and the frame member correspondingly constructed that the screen and/or plastic or other film, preferably but not necessarily pliable, is or are releasably retained in said frame member so that the film can be added to or removed from the screen without the use of any unusual tool or skill. In a further embodiment of the invention, four ends of a rectangularly shaped, or all the ends of a polygonally shaped, screen are adapted to be releasably or otherwise engaged in a framing element provided at each of said ends to tautly retain a combination of a film and such a screen element in an opening providing a closure therefor.

The provision of storm windows, especially in areas in which winters are not too severe, yet are cold enough to cause condensation inside of windows, running onto the painted sash and dripping water onto walls and floors, etc., is an expensive matter. Also, many homeowners do not desire to alter the appearance of an attractively designed window or door opening by placing thereon anything more than already is there and has been contended with in the overall designing of the same.

The installation of removable storm windows is being gradually given up for the easier to handle on a once-to-be-installed basis aluminum or other expensive metal permanently installed frame-type storm window. Since the average homeowner is reluctant to continue to lift into place each year heavy storm windows and only very reluctantly will buy the permanently installed type here described for reasons apparent herein, albeit the latter can be and are highly desirable in most instances, there has been developed a need for an easy to install, cheap to buy storm window.

Plastic and other pliable films have been used to provide a storm window effect.

Such films have been put up by folding into the ends a nailing strip, usually made of cardboard, and then nailing through the plastic film and strip into the frame of the window or door. Or, separate frames for the film have been provided essentially to fit into the space occupied by the screens which are removed during the season in which protection is desired. These screens are stored away, requiring storage space, etc. It also has been proposed to roll down on the outside of a screen a film of plastic and to fix it at its bottom ends separately by a retaining means which is permanently attached to the bottom end of the screen, said retaining means being then separately fixed to the bottom of the window by means provided there for the purpose. Such a plastic film has required at its lower end a permanently affixed metal piece. Also, it has been proposed to permanently fix at the top and bottom ends of a sheet of plastic members into which the plastic is permanently fixed and to use said members to secure the plastic sheet into a window opening.

It has now occurred to use, while attempting to somehow add a plastic film to a window containing an aluminum tension screen, essentially comprising top and bottom retaining elements, said elements being channelled to receive beaded ends of aluminum screening, that it is necessary only, and, in fact, highly desirable, to remove the screen from the channels, fold the film over the beaded ends and to reinsert the thus covered screen ends into the channels. The retaining elements remaining essentially unaltered and the plastic being made taut as the screen is stretched back into the window opening, no tools or specialized skill were needed to be used. The plastic film in actual reduction to practice here described was mounted into the tension screen on the window side so that it could not be buffeted by wind and was protected against deterioration as by wind and/or flying objects, by the aluminum screening. Thus, while the plastic could be mounted on the outside of the screen, this is not now preferred. Some of the screens converted were covered with plastic of the same width as the screening so that, as the screen was stretched into place the plastic fitted nicely into the shoulder normally receiving the screen on the vertical sides of the window frame. In other conversion, the film was purposefully cut wider than the screening so that, as the screen was stretched into place, holding the lower end downward when the screen was attached at the upper end and drawing the lower end into the window, the overlapping plastic was pinched, as it were, into the window frame. Also, in some of the screens, the plastic was folded over the beading only once, that is, there was only one folding line at each end of the film. In these instances, it was found preferable to use a somewhat stiffer film, i.e., a film which was somewhat more rigid. Such film was also somewhat thicker than that used in other instances in which there were two and even three folds as appears herein.

It is an object of this invention to provide a closure for an opening. It is another object of the invention to provide a protection for an opening, as from cold or rays of the sun. It is a further object of the invention to provide a novel storm shield to protect a window or door or other opening. It is a still further object to provide for the conversion of an existing tension screen to a storm shield or window without the use of tools or special skills, thus to enable the average homeowner to convert a tension screen in a few moments to a storm window or shield. Still another object of the invention is to provide a protected plastic storm shield. A further object of the invention is to provide a releasably installed plastic film in an existing screen means. Another object of this invention is to provide a method for the conversion of a tension-type screening means into a storm shield or window.

Other aspects, objects and the several advantages of the invention are apparent from this disclosure, the drawing and the appended claims.

According to the present invention, there is provided a method of forming a closure for an opening which comprises providing a screen, framing elements for said screen, means to fix said elements into an opening, a film element extending over and at least coextensive with said screen, retaining means upon each of said elements adapted to receive and to retain an end of said screen and the end of said film at the said end of said screen and placing each said end of said screen and each said end of said film at each said end of said screen together and rendering said retaining means operative to retain said ends which are now together. In a particularly preferred form of the invention, the screen and plastic are placed together and slidably engaged into the retaining member thus making it possible to disassemble the unit, remove the film or plastic, and to replace the screening unit minus the film.

Also, according to the invention, there is provided a closure means which comprises a screen adapted to extend substantially across an aperture to be closed, a film of material extending over and substantially coextensive with said screen, at least one framing retaining means at at least each of two ends of said screen, said framing retaining means being adapted to retain together the ends of said screen and of said film. In a preferred form, according to the invention, the framing and retaining means releasably retain together the ends of the said screen and of the said film.

Figure 2:
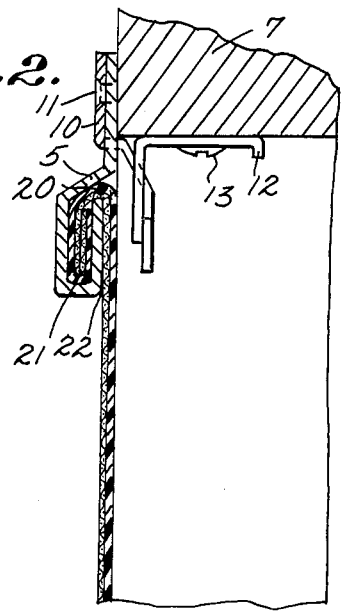
Figure 3:
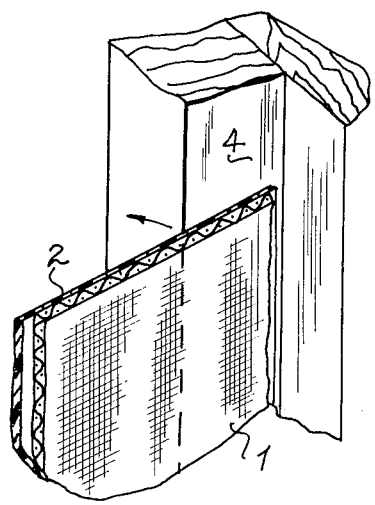
Figure 3:
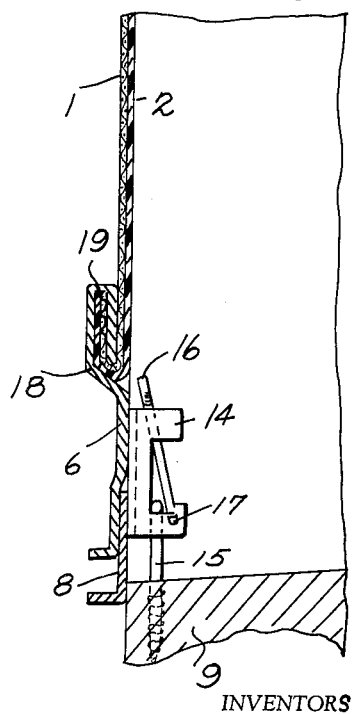

Referring now to the drawing, FIGURE 1 shows the general aspect viewed from the outside of a window of a converted tension screen according to the invention. FIGURE 2 is a vertical cross section taken along the line 2—2 of FIGURE 1. FIGURE 3 is a break-away portion of FIGURE 1 taken at the portion of FIGURE 1 which is enclosed by the circle.

Referring now to FIGURE 1, it will be seen that the window, as viewed from the outside of the house, shows essentially only the same aspect to the casual viewer as it does when equipped only with the tension screen. Behind the tension screen there can be seen in FIGURE 1 in which a portion of the screen has been removed for the purpose the plastic membrane or film. Then, so that the relative positions of the screen and plastic film can be seen with respect to the window, a portion of the plastic film has been torn away, so to speak, to show the window sash. Thus, a screen 1 has been fitted with a plastic film or membrane 2 to protect a window sash 3. Closer observation of FIGURE 1 will show that the screen holds into position in shoulder 4 the plastic film 2 which, in this embodiment, has substantially the same width as screen 1. Since the tension screen is an existing one, according to the invention, it can be such a screen, although it can be a screen manufactured for the purpose, according to the invention, it is clear that upper retaining member 5 and lower retaining member 6 are so constructed and arranged into the window frame as to provide protection against entry of insects and, therefore, are substantially air-tight. In actual practice, these screens are extremely well made and the retaining elements, being machine made, fit snugly into the window frame. In the event that the film 2 is cut wider than screen 1, the film, if sufficiently pliable, will be drawn into the shoulder 4 by screen 1.

Referring now to FIGURE 2, in which elements identified by numbers 1, 2, 5 and 6 are the same as in FIGURE 1, it will be seen that element 5 fits snugly to the top of the window frame 7 and that element 6 with its slidable extension 8 fits snugly against the window sill portion 9.

Element 5 is held against portion 7 of the top window frame by means of hook element 10 which is riveted at 11 to element 5. Element 10 passes through slotted element 12 which is attached to element 7 by means of screw 13.

Element 6 and its slidable element 8 are held in position by means of clamp 14 and T screw 15. Clamp 14 is provided with pulling member 16 which is pivoted at 17.

According to one form of the invention, plastic sheet or film 2 is folded around screen 1, as shown at 18. It will be observed that the screen is folded once and is slidably engaged in channel member 19 together with the plastic film. The arrangement shown in the drawing, in which it has been noted there is only one fold of the screen and of the plastic, is particularly well adapted to heavier gauge plastic, such as semi-rigid polyethylene.

The arrangement at the top of the screen is somewhat different. Here, the screen is folded twice—once at 20 and then again at 21. This provides a double layered beading around which the plastic is folded twice—once at 20 and once at 21. Again, the screen and plastic are slidably mounted into the channel of element 5.

Polyethylene and vinyl plastic films were used in the thicknesses mentioned herein.

Various arrangements and modifications of the channel members and of the screen beading can be provided by one skilled in the art in possession of this disclosure having studied the same. For example, there can be provided at each end or an end of the screen a longitudinal beading of substantially cylindrical shape and this beading can be attached to the end of the screen, as by slotting the same, inserting the screen and pressing, welding or soldering the screen therein. When this is done in lieu of the channels, as shown in FIGURE 2, there need be but an essentially circular channel into which the beading can be slidably mounted. Or, if desired, in lieu of slidable engagement, as in the actual reduction to practice, above described, the screen and plastic can be placed into a single clamp element to be therein clamped into position, preferably before the retaining elements 10 and 6 are placed into position. Thus, the essence of the invention is found in its broadest form of embodiment in the concept that the plastic is wrapped to the screen end and the screen end placed wherever it ordinarily would go for a ready and rapid conversion, without tools or special skill into a storm shield. However, in its narrower aspects, the particular configuration and modifications thereof which are evident upon a consideration of this disclosure, the invention is found in the application of the plastic to the existing forms of tension screens.

Referring now to FIGURE 3, it will be seen how the screen 1 holds plastic 2 against the vertical portion of the window 4.

As explained, the plastic can be made to extend so that it will corner around element 4.

Consideration of the combination of elements which form at least one embodiment of this invention will lead one skilled in the art to recognize that the screen provides a support, as well as a protection, for the plastic. Thus, in the preferred form of the invention in which the plastic is so mounted and the screen retaining members are so mounted that the plastic is to the window side of the screen, there is a protection against flying objects or other accidental destruction of the plastic. Also, because the screen is to the outside, the plastic is protected from a good bit of heat when the sun is shining.

While support members have been shown at the top and at the bottom of the screen, it is within the scope of the appended claims to provide additional supports along the vertical sides of the window and to clamp together the screen and the plastic film at said sides. Thus, by way of further explanation, the side supports can be identical with the top and bottom supports or can be different therefrom. When different therefrom, it is within the scope of the invention to loosely apply a clamping or channel member to hold together the edge of the screen and the edge of the plastic film, which, as desired, can be wrapped around the end of the screen, or not, as the case may be, and then, when the tension has been applied, the channel member can be securely clamped to the screen and plastic, thus stiffening further the assembly, rendering it adaptable to very large windows of extraordinary size or openings which are in such locations as to be subjected to winds of gale or stronger proportions.

It is also within the scope of the appended claims in lieu of top and bottom supports to have only side retaining members and to stretch the plastic and screen, as it were, in a horizontal direction.

It will be noted that the invention is operative to apply a tension to the screen at the same time that the tension is applied to the plastic. This is a particularly important result of the invention, since it will be appreciated that the screen has a limited stretchability. This assures that the plastic will not be overstretched. Thus, by properly laying the plastic and screen together in the first place, one is assured that, when the screen is mounted, there is a real protective limit to the tension which will be applied to the plastic and, therefore, one who is not skilled is, as it were, protected against his own lack of knowledge as to how much tension he would be applying to the film. Thus he will not destroy the plastic film and will not become dissatisfied with his purchase. This result of the invention cannot be too strongly emphasized in the light of the marketability of a product which is cheap, simple and, yet, foolproof.

In the event in which the plastic is folded at least twice around a beading, as shown in element 5, it is sometimes helpful to slide a cardboard into the space in which portion 22 of member 5 extends. Then, as element 5 and, therefore, portion 22 slidably engages the screen and plastic assembly, the cardboard can be drawn through the channel or grove as portion 22 takes over the space occupied by the cardboard. This modus operandi assures that the plastic is retained in place until the channeled member has been completely telescoped with the plastic covered beaded member of the screen.

It may be that with some channeled members which are now on the market it will be necessary to instruct the homeowner to somewhat enlarge or widen the channel. This can be done easily with a screwdriver, thus to accommodate plastics of larger thickness or to accommodate the regular or thinner plastic in the event that the channel member has not been formed with the usual clearance. Thus, the invention takes advantage of the usual clearance in present-day tension screen channels to mount the plastic therein without any use of any tool whatsoever.

*Example*

The embodiments, as described herein, have been used to cover the 18 windows of a split-level colonial-type home. The same plastic that was applied to the windows and used on the windows with no further attention devoted thereto during the first winter and left thereon for a total of five months have now, each of them, been remounted in the same positions and have been in position for about three months without further attention to the same. There has been no destruction due to wind velocity or other weather condition. In each bedroom and occasionally in the other rooms, the screens have been opened at night to take in air for sleeping purposes. This has been done by use of handle 16 and clamp member 14. The lower end of the screen has been held in open position by simply leaving handle 16 below the T portion of T pin 15 and placing a clamping clothes pin on element 15 above element 16, thus preventing motion of the lower end of the screen.

The plastic films used in this example were 2, 4 and 10 mils in thickness. Some windows, both large and small, were equipped with each of the thicknesses. The thickest film was folded over only once, as earlier described, and is now holding satisfactorily for a second season. The other thicknesses were used with both types of folding described herein.

Thus, it is that the storm shield, according to the invention, is operative advantageously to be opened without much ado.

In the foregoing example, the windows were of all sizes. Some of these windows are quite large, being about 5 feet high and about 3½ feet wide.

It will be understood by those skilled in the art in possession of this disclosure that the extreme simplicity of the concept and the resulting combination of steps and/or means to effectuate the invention lend it great value over prior art of which we are aware. Thus, no additional machining or parts are required. Of course, if the screen device is designed especially for ready conversion, additional simplification or modification can be made within the scope of the claims. The point to note is, however, that no modification of an existing tension screen need be made, no modification of an existing window need be made and that the plastic after it has served its purpose during a period of time can be removed and, for that matter, used for other purposes and then again reused at the change of seasons, as before.

Reasonable variation and modification are possible within the scope of the foregoing disclosure, the drawing and the appended claims to the invention the essence of which is that there have been provided a method and means for closing an aperture or opening, such as a window, with a storm shield and for converting an existing or a designed for the purpose tension screen to make such a storm shield; the method and means in their broadest forms being essentially as described herein and delineated in claims 2 and 3 hereof, respectively, and in a specific embodiment the means being as herein described and delineated in one or more of the remaining claims.

We claim:
1. A closure means which comprises a screen adapted to extend substantially across an aperture to be closed, a film of material separate from said screen extending over and substantially completely coextensive with said screen, the film of material extending beyond each of at least two opposite ends of said screen, at least two of the edges of said opposite ends of each of said screen and said film being contiguously disposed in contact with each other with the portions of the film which extend beyond the screen at least partly surrounding the ends of said screen, a framing retaining means at each of the said two ends of said screen and said film, said framing retaining means simultaneously releasably retaining together the contiguously disposed ends of said screen and of said film, and means upon said framing retaining means permitting the film and screen to be placed thereinto manually and to then be retained therein until manually released from said framing retaining means.

2. A closure means comprising at least two parallel screen and retaining means fitting and releasably fixable into a window opening, said retaining means receiving and manually releasably retaining a screen and a film of material separate from said screen together and being provided for this purpose with a channel slidably receiving a formed end of said screen, the sliding being in a direction which is parallel to the axis of said channel, by sliding said formed end manually into said channel, said screen extending substantially completely over and across said opening and having formed end axially slidably received into said channels, a film extending substantially over and across said screen, ends of said film at least partly covering the formed ends of said screen, the said formed ends of said screen and the portion of the film covering said formed ends of said screen being retained in the channels of said retaining means upon the sliding of said screen end and film covering the same into said channel.

3. An opening closure comprising, in combination, a screen adapted to extend substantially over and across said opening, at least one retaining member means at at least two ends of said screen to stretch said screen in said opening, a plastic film separate from said screen extending substantially completely over and across said screen, the plastic film extending beyond at least two opposite ends of said screen, at least two each of the edges of said opposite ends of said screen and said plastic film being contiguously disposed in contact with each other and manually releasable retaining means on each of said retaining elements for simultaneously and releasably retaining together and holding the contiguously disposed ends of said screen and plastic film and to simultaneously stretch said screen and plastic film by tension applied through said retaining means to said contiguously disposed ends of said screen and plastic film, said retaining means which is manually operative comprising means for retaining said screen and plastic film so the film can be reused by repeatedly installing and removing said film into and from said retaining means by simply extending the end portions of the film around the ends of the screen and manually inserting the contiguously disposed ends of the screen and film into said clamping means.

4. A closure means according to claim 1 wherein a beading is formed on the screen by folding over the end thereof, the film of material is folded over said beading and wherein the beading with the film of material folded thereover is retained in said retaining means.

References Cited in the file of this patent

UNITED STATES PATENTS

| | | |
|---|---|---|
| 1,011,234 | Murphy | Dec. 12, 1911 |
| 1,242,789 | Franz | Oct. 9, 1917 |
| 1,842,640 | Zimmerlie | Jan. 26, 1932 |
| 2,318,967 | Pillsbury et al. | May 11, 1943 |
| 2,605,828 | Lang | Aug. 5, 1952 |
| 2,624,404 | Burns | Jan. 6, 1953 |
| 2,728,390 | Turner | Dec. 27, 1955 |
| 2,818,918 | Lohr | Jan. 7, 1958 |
| 2,889,876 | Lockhart | June 9, 1959 |
| 2,895,565 | Le Brun et al. | July 21, 1959 |

FOREIGN PATENTS

| | | |
|---|---|---|
| 122,088 | Germany | July 5, 1901 |